US012769811B2

(12) United States Patent
Rosskamp et al.

(10) Patent No.: US 12,769,811 B2
(45) Date of Patent: Oct. 20, 2026

(54) TOKEN FOR USER-RELATED CONTROL OF A CRAFTSMAN DEVICE

(71) Applicant: WÜRTH INTERNATIONAL AG, Chur (CH)

(72) Inventors: Heiko Rosskamp, Adelberg (DE); Adrien Marquette, Schwäbisch Hall (DE); Louisa Aschoff, Neuenstein (DE)

(73) Assignee: WÜRTH INTERNATIONAL AG, Chur (CH)

( * ) Notice: Subject to any disclaimer, the term of this patent is extended or adjusted under 35 U.S.C. 154(b) by 37 days.

(21) Appl. No.: 18/687,786

(22) PCT Filed: Jul. 28, 2022

(86) PCT No.: PCT/EP2022/071158

§ 371 (c)(1),
(2) Date: Feb. 28, 2024

(87) PCT Pub. No.: WO2023/030777

PCT Pub. Date: Mar. 9, 2023

(65) Prior Publication Data

US 2024/0394348 A1 Nov. 28, 2024

(30) Foreign Application Priority Data

Aug. 31, 2021 (EP) .................................... 21290054

(51) Int. Cl.
*G06F 21/31* (2013.01)

(52) U.S. Cl.
CPC .................................... *G06F 21/31* (2013.01)

(58) Field of Classification Search
CPC ........ G06F 21/31; G06F 21/6218; B25F 5/00; A61B 5/0002; A61B 5/117; G08B 21/02; B23Q 11/0092; B23Q 17/12
(Continued)

(56) References Cited

U.S. PATENT DOCUMENTS 7,628,219 B2 * 12/2009 Frauhammer ............. B25F 5/00 173/29
9,027,110 B2 * 5/2015 Lu ......................... H04W 12/06 713/160
(Continued)

FOREIGN PATENT DOCUMENTS

DE 102 58 900 A1 7/2004
DE 102 48 389 A1 8/2004
(Continued)

OTHER PUBLICATIONS

European Office action for Application No. 21 290 055.9 dated Apr. 11, 2025, 6 pages.
(Continued)

*Primary Examiner* — James N Fiorillo

(74) *Attorney, Agent, or Firm* — Womble Bond Dickinson (US) LLP

(57) ABSTRACT

Token for user-related control of a craftsman device, the token having a processor which is configured for control-related interaction with the craftsman device, an identification means which is configured to identify a user of the token, and a memory means with stored information, which are indicative of a personalized authorization profile of the user in relation to the craftsman device or allow access thereto, the processor being configured to allow, set and/or prevent use of the craftsman device by the user based on the personalized authorization profile when the token is coupled to the craftsman device.

14 Claims, 3 Drawing Sheets

(58) Field of Classification Search
USPC .............................................................. 726/7
See application file for complete search history.

(56) References Cited

U.S. PATENT DOCUMENTS

| | | | |
|---|---|---|---|
| 9,595,839 B2 | 3/2017 | Furui et al. | |
| 11,381,271 B1 * | 7/2022 | Zalewski .............. | H04W 76/10 |
| 12,263,711 B2 * | 4/2025 | Negishi .............. | B60G 17/0157 |
| 2003/0014657 A1 * | 1/2003 | Hsieh .................. | G06F 21/6218 726/9 |
| 2004/0117318 A1 * | 6/2004 | Grawrock .......... | G06Q 20/3672 705/66 |
| 2004/0249764 A1 * | 12/2004 | Delitz .............. | G07B 17/00435 705/60 |
| 2006/0087286 A1 * | 4/2006 | Phillips ..................... | B25F 5/00 320/114 |
| 2007/0245369 A1 * | 10/2007 | Thompson .............. | H04L 63/10 725/30 |
| 2014/0069672 A1 * | 3/2014 | Mashiko ................. | B25B 21/00 173/47 |
| 2014/0070924 A1 * | 3/2014 | Wenger ..................... | B25F 5/00 340/10.1 |
| 2014/0101747 A1 * | 4/2014 | Lu ....................... | H04W 12/068 726/9 |
| 2014/0159919 A1 * | 6/2014 | Furui ........................ | B25F 3/00 340/870.07 |
| 2015/0350345 A1 * | 12/2015 | Hashimoto ............. | H04L 67/60 709/219 |
| 2016/0294028 A1 * | 10/2016 | Ye ......................... | H01M 4/624 |
| 2017/0070483 A1 * | 3/2017 | Sammet ................ | G06F 21/123 |
| 2017/0173751 A1 * | 6/2017 | Stock ................. | B23Q 11/0092 |
| 2017/0177894 A1 * | 6/2017 | Stock .................. | H04L 63/0861 |
| 2018/0107191 A1 * | 4/2018 | Kubat ................ | G05B 19/4186 |
| 2018/0285888 A1 * | 10/2018 | Staebler ................. | G06Q 10/08 |
| 2019/0043292 A1 * | 2/2019 | Hoossainy ......... | G07C 9/00309 |
| 2019/0067751 A1 * | 2/2019 | Funk ................... | H01M 50/267 |
| 2019/0067756 A1 * | 2/2019 | Lee ..................... | H01M 10/441 |
| 2019/0258797 A1 * | 8/2019 | Horie ...................... | G06F 21/34 |
| 2020/0251917 A1 * | 8/2020 | Ljung ..................... | B60L 53/65 |
| 2021/0149626 A1 * | 5/2021 | Dobashi .................... | B25F 5/00 |
| 2022/0156412 A1 * | 5/2022 | Davis ........................ | B25F 5/00 |
| 2024/0394348 A1 * | 11/2024 | Rosskamp ............. | G06F 21/31 |

FOREIGN PATENT DOCUMENTS

| | | | |
|---|---|---|---|
| EP | 1 720 122 | A1 | 11/2006 |
| EP | 3189943 | A1 | 7/2017 |
| WO | WO 2006/021047 | A1 | 3/2006 |
| WO | 2013014914 | A2 | 1/2013 |
| WO | 2020/125839 | A1 | 6/2020 |

OTHER PUBLICATIONS

International Search Report of PCT/EP2022/071158, Nov. 10, 2022, 4 pages.
Extended European Search Report of EP 21290054.2, Feb. 24, 2022, 7 pages.
International Search Report of PCT/EP2022/071152, Oct. 13, 2022, 4 pages.
International Search Report of PCT/EP2022/071164, Oct. 14, 2022, 4 pages.
International Search Report of PCT/EP2022/071168, Oct. 17, 2022, 4 pages.
Extended European Search of 21290055.9, Feb. 23, 2022, 7 pages.
Extended European Search of 21290053.4, Feb. 22, 2022, 7 page.
Extended European Search of 21290059.1, Feb. 23, 2022, 6 pages.
US Office action for U.S. Appl. No. 18/687,789, Jul. 11, 2025, dated 34 pages.
US Office action for U.S. Appl. No. 18/687,766, Jul. 14, 2025, 38 pages.
European Office action for Application No. 21 290 059.1, dated Jan. 31, 2025, 4 pages.
U.S. Office action for U.S. Appl. No. 18/687,766, dated Dec. 15, 2025, 40 pages.
U.S. Office action for U.S. Appl. No. 18/687,789, dated Jan. 16, 2026, 29 pages.
U.S. Office Action for U.S. Appl. No. 18/687,766, dated Apr. 23, 2026, 35 pages.
U.S. Office Action for U.S. Appl. No. 18/688,277, dated May 13, 2026, 43 pages.

* cited by examiner

TOKEN FOR USER-RELATED CONTROL OF A CRAFTSMAN DEVICE

CROSS-REFERENCE TO RELATED APPLICATION

This application is a national stage application, filed under 35 U.S.C. § 371, of International Patent Application No. PCT/EP2022/071158, filed on Jul. 28, 2022, claiming priority of the European patent application EP 21 290 054.2 filed on Aug. 31, 2021, all of them being incorporated by reference herein in its entirety.

FIELD OF INVENTION

The invention relates to a token for user-related control of a craftsman device, a craftsman equipment and a method for user-related control of a craftsman device by means of a token.

ART BACKGROUND

Conventional hand-held tools are controlled directly by a user. For example, a drill is controlled by a user inserting a suitable drill bit into the drill and then pressing an actuation button on the drill. If a user without specialist knowledge performs a delicate manual task using such a hand-held tool, this can lead to incorrect operation, an undesirable result and a risk to operational safety.

DE 10258900 A1 discloses a cordless screwdriver for tightening screw components, with a screwdriver motor which is supplied with electrical voltage from a self-sufficient power supply arranged on the cordless screwdriver, at least three measuring devices which are provided for monitoring screwdriving parameters during the screwdriving process, namely a torque sensor, with which the tightening torque generated by the screwdriver motor can be measured, a rotation angle sensor, with which the current screw-in angle can be measured, starting from a predetermined measuring position, and a current sensor, with which the drive current of the screwdriver motor can be measured. Furthermore, monitoring electronics are provided which switch off the screwdriver motor if the tightening torque, the screw-in angle and the drive current are all within a predetermined, assigned target parameter window.

Conventional hand-held tools reach their limits, especially when it comes to difficult or unusual processing tasks using a hand-held tool.

SUMMARY OF THE INVENTION

There is a need of the present invention to enable operation of a hand-held tool in a simple, safe and error-resistant manner.

This need is met by the objects with the features according to the independent patent claims. Further embodiments are shown in the dependent claims.

According to an exemplary embodiment of the present invention, a token is created for user-related control of a craftsman device, the token comprising a processor configured for control-related interaction with the craftsman device, an identification means configured to identify a user of the token, and a memory means with stored information, which are indicative of a personalized authorization profile of the user in relation to the craftsman device or allow access to the authorization profile, the processor being configured to allow, set and/or prevent use of the craftsman device by the user on the basis of the personalized authorization profile when the token is coupled to the craftsman device.

According to a further embodiment of the invention, a craftsman equipment is provided comprising a token having the features described above and a craftsman device configured to be coupled to the token such that a use of the craftsman device coupled to the token by a user is allowed, set and/or prevented based on the personalized authorization profile.

According to a further embodiment of the invention, a method for user-related control of a craftsman device by means of a token having the features described above is provided, wherein the method comprises identifying a user of the token, finding a personalized authorization profile of the user of the token, and, upon coupling the token with the craftsman device, allowing, setting and/or prohibiting a use of the craftsman device by the user based on the personalized authorization profile.

In the context of the present application, a "token" can be understood in particular as a recognition token that can form a functional coupling between the token and a craftsman device. Such an identification token can be used in a coupled system, which can comprise the token, a craftsman device mechanically coupled thereto and optionally one or more other devices or nodes. In particular, a token may be a hardware component for identifying and/or authenticating a user to whom the token may be assigned. A token may be an electronic token and may, for example, provide a processor-related control, monitoring and/or communication function.

In the context of the present application, a "craftsman device" can be understood in particular as a device that is used by a craftsman during a manual activity. In particular, this may be an electric hand-held tool (such as a cordless screwdriver), a (particularly non-electric) tool (for example a hammer, pliers, file, screwdriver or drill) or a tool set with several tools or tool elements (for example a drill box with drills or a bit box with bits), a storage system (for example, a toolbox), consumables (for example, bolt anchors or a box of screws), and/or a vehicle (for example, a motor vehicle in which a craftsman can transport his equipment to a work site, a forklift or a tool cart) and/or other craftsman equipment (for example, a ladder). A craftsman device can also be a battery pack or an adapter between a battery pack and a processing device (for example, a drill module of a drill). For example, a token can be inserted into such a battery pack or such an adapter.

In the context of the present application, a "hand-held tool" can be understood in particular as a portable device that can be operated and carried manually by a user and with which a manual task can be performed, for example working on a surface. Advantageously, the hand-held tool can be an electric hand-held tool that can be operated by means of an electrically generated driving force. Such an electric hand-held tool can be controlled by means of electrical control signals—in particular provided by means of a token. In particular, a hole can be drilled in a substrate and/or a driving force in the form of a longitudinal force and/or a torque can be applied to a fastening element to be set in a substrate by means of a hand-held tool and by applying a driving force in the form of a longitudinal force and/or a torque. For example, the hand-held tool can be configured to rotate a processing device and thus a drill and/or a fastening element. Examples of electric or motorized hand-held tools are a cordless screwdriver, a cordless drill driver, a rotary screwdriver, a pulse screwdriver, a ratchet screwdriver, a drill, an impact screwdriver (in particular a cordless impact screwdriver) and a hammer drill.

In the context of the present application, a "craftsman equipment" may be understood in particular as a set comprising a plurality of craftsman devices which a craftsman uses in combination to perform craftsman's tasks. For example, a craftsman equipment may comprise at least ten, in particular at least one hundred, craftsman devices.

In the context of this application, the term "processor" can be understood in particular to mean an electronic entity which can contain an arithmetic unit and/or a control unit and/or can be configured for data processing. In particular, such a processor can have a controlling effect on a craftsman device mechanically coupled to the token and thereby set an operation or an operating mode of the craftsman device (in particular a hand-held tool). In particular, the processor can control the setting of the operation or mode of operation of the craftsman device or a part thereof, in particular based on a user profile of a user of the token. The control logic between the token and the craftsman device and/or between the token and another node (in particular a further node or a central control means) can, for example, take place according to a master-slave architecture or according to a peer-to-peer architecture. The processor of the token can alternatively or additionally take on other functions, for example evaluating sensor signals from a sensor of the token, controlling communication with another node via a communication network, etc. A processor can, for example, be realized by a processor component, a plurality of processor components or a part of a processor component.

In the context of the present application, "user-related control of a craftsman device" can be understood in particular as a control of a craftsman device that takes into account specific features of a user of the craftsman device or makes these specific features of the user the basis of the control. In particular, physical and/or biological characteristics and/or existing and/or missing abilities and/or authorizations of a user can be included in the control logic for controlling a craftsman device.

In the context of the present application, an "identification means for identifying a user of the token" can be understood in particular as an entity or a function block of the token which provides information for determining the identity of the user of the token. An identification means can carry out the identification of a user, for example, using sensor data indicative of a user identity (such as sensor data from a fingerprint sensor) and/or by means of a corresponding user input (for example, entering a user ID, optionally in combination with a password). As part of the identification of a user, the identification means can in particular carry out a comparison between the determined sensor data (e.g. actual fingerprint data) and predetermined reference data (e.g. target fingerprint data). It is also possible to carry out identification by means of a transponder, for example by means of an NFC (near field communication) transponder in a mobile device or by means of an RFID (radio frequency identification tag) transponder of a user (for example in a device key).

In the context of the present application, a "personalized authorization profile of a user in relation to a craftsman device" can be understood in particular as a data record relating specifically to a user, which gives this user specific rights of use (for example, the right to use a hand-held tool) in the context of the use and/or management of a specific craftsman device of a craftsman equipment, if the user has received appropriate instruction or has a corresponding driver's license), usage restrictions (for example, the right to use only a hand-held tool that does not exceed a certain maximum weight or if the user is wearing associated work protection means) and/or usage prohibitions (for example, the prohibition to use a hand-held tool if the user has not received appropriate instruction or does not have a corresponding driver's license). A specific assignment of authorizations, authorization restrictions and/or authorization prohibitions to specific craftsman devices can be made in the authorization profile.

In the context of the present application, "information indicative of a personalized authorization profile of the user with respect to the craftsman device" can be understood to mean, in particular, a data record on a token that assigns the user usage rights, usage restrictions and/or usage prohibitions for one or more specific craftsman devices.

In the context of the present application, "information that allows access to a personalized authorization profile of the user in relation to the craftsman device" can be understood to mean, in particular, access data that allows a user an access option to a data set that assigns the user usage rights, usage restrictions and/or usage prohibitions for one or more specific craftsman devices, without the data set being stored in full in the token. Such an access option can be, for example, a link (in particular in combination with a password) in a communication network via which the token can retrieve the authorization profile (in particular password-protected). Such an access option can also consist of a token being able to retrieve the personalized authorization profile from a craftsman device mechanically coupled to the token if this mechanical coupling exists.

According to an exemplary embodiment of the invention, a token can control a craftsman device coupled thereto in a user-specific or user-related manner. For this purpose, the token can first identify a user in order to then be able to take into account a personalized authorization profile of the identified user in relation to the craftsman device selected for the desired use as the basis for controlling the craftsman device. Triggered in particular by the formation of a mechanical coupling between the token and the craftsman device, the user can then be allowed use of the craftsman device or denied access rights, or the manner of use can be regulated in accordance with the personalized user profile. By assigning a user-related authorization profile to individual craftsman devices of a craftsman equipment, even in complex systems with a large number of craftsman devices, tokens and users, a fast and error-resistant comparison between user profiles and craftsman devices can be carried out by means of a user-related token in particular, thus achieving efficient access management. At the same time, a high degree of operational security can be achieved, as the administration of authorizations is made possible efficiently and securely even with a confusingly large number of craftsman devices, users and tokens.

Additional exemplary embodiments of the token, the craftsman equipment and the method are described below.

According to an exemplary embodiment, the user's authorization profile can be stored in the token's memory means. Direct access to the user profile is then possible, in particular by the token's processor. According to this embodiment, the token itself is already individualized and personalized.

According to another exemplary embodiment, the token may comprise a communication means (for example comprising a transmitting and/or receiving antenna) configured to communicate by means of a communication network (for example the public Internet, an intranet or a mobile network) for obtaining the authorization profile of the user identified by means of the identification means using the access allowing information. According to such an embodiment, the user profile is not stored directly on the token, but can be retrieved, for example, via a corresponding link from a node in the communication network with which the token can communicate. Said node may, for example, be a central control means of the handheld equipment, which may have access to a central memory means or a database in which, for example, a large number of authorization profiles (preferably relating to craftsman devices) are stored centrally for a large number of tokens and for a large number of users. If such a central storage resource is provided, the decentralized storage resources for the large number of tokens can be reduced or even completely dispensed with. This reduces the overall hardware requirements of the craftsman equipment.

According to an exemplary embodiment, the identification means can have a user identification sensor, in particular a fingerprint sensor or a face recognition sensor. Such a user identification sensor can be provided on the token itself, in particular on an external sensor surface of the token. If a user wants to use a craftsman device (e.g. a drill) of a craftsman device equipment (e.g. a machine park), he simply places a finger on the fingerprint sensor of his token and thereby identifies himself to the token. Based on this identification information, the token can determine the relevant user profile of the user. By mechanically coupling the token with a craftsman device that the user wishes to use, a match can be triggered to determine whether or not the use of the craftsman device is authorized given the user's user profile and, if so, whether the use of the craftsman device is subject to restrictions given the attributes of the user and/or the craftsman device. From the user's perspective, this complex process requires nothing more than performing a user identification using the token's user identification sensor and mechanically coupling the token with the craftsman device. Otherwise, a user does not need to do anything. The process of user-specific management of access rights to craftsman devices is therefore simple and straightforward from a user's point of view and error-resistant from the point of view of the handheld equipment.

According to an exemplary embodiment, the processor can be configured to compare a user identity determined by means of the identification means with the authorization profile and, based on this, to control whether the use of the craftsman device by the user is allowed or prevented and/or how the use is set. The allowing of unrestricted or restricted access rights or the denial of access rights to a craftsman device can therefore be carried out by comparing an authorization profile identified by the user's identification with a craftsman device for which a user expresses a desire for access by mechanically coupling it with his token.

According to an exemplary embodiment, the personalized authorization profile can comprise at least one piece of information from a group consisting of a prohibition of use for at least one defined operating mode of the craftsman device based on a user qualification and/or on a physical or biological user characteristic, a user-specific permission of use for at least one defined operating mode of the craftsman device, and a health and safety-related condition of use for the use of the craftsman device. A user qualification that can be reflected in a user's authorization profile is, for example, instruction in the use of a craftsman device (e.g. a chainsaw) and/or the existence of a certificate of authorization required in a jurisdiction to operate a craftsman device (e.g. a driving license that entitles the holder to drive a forklift truck). A physical user characteristic can be, for example, a physical limitation of a user that restricts the use of a craftsman device, for example for medical reasons or for reasons of occupational safety. A biological user characteristic can be, for example, an age that restricts the use of a craftsman device, for example for medical or occupational safety reasons. For example, users above or below a certain age may only be allowed to use hand-held tools up to a specified weight limit, which may also be reflected in the personalized authorization profile. For health and safety reasons, it may be mandatory to wear certain protective equipment (e.g. safety goggles, protective gowns, etc.) when using certain craftsman devices. The use of such a craftsman device can, for example, be denied to a user until it has been verified that the user is wearing the prescribed protective equipment. For example, protective equipment can be provided with a token for this purpose, which can be communicatively coupled with a token that is mechanically coupled to a craftsman device. Only when the token on the craftsman device has been notified by communication with the token on the protective equipment that the required protective equipment is present can the use of the craftsman device be allowed by the processor of the token in the craftsman device. This can increase operational safety.

According to an exemplary embodiment, the processor can be configured to allow or prevent the downloading of a data record, in particular a data record defining an operating sequence of the craftsman device, from a communication network when coupling with the craftsman device based on the personalized authorization profile. If a comparison of the authorization profile of an identified user with a craftsman device for which the user expresses a wish to use by mechanically coupling with his token shows that use is allowed in whole or in part, a download of operating information relating to this craftsman device can be triggered or allowed. The processor of the token can then control the use of the craftsman device on the basis of the downloaded operating information.

According to an exemplary embodiment, the processor can be configured to enable operation of the craftsman device coupled with the token only if a user identification carried out in advance by means of the token has led to the result that an identifying user is authorized to operate the craftsman device. According to an exemplary embodiment, operation of the craftsman device can be prevented without coupling with the token. Without positive verification of a user's authorization to use a particular craftsman device, use of the craftsman device may be disabled. If a user presses an operating button of a drill without or before verification of the user authorization, the processor of the token disables the drilling operation of the drill. The need for positive confirmation of the user authorization of a craftsman device by a user increases operational safety and prevents misuse.

According to an exemplary embodiment, the processor of the token can be configured to allow, set and/or prevent the use of the respective craftsman device by the user in different ways based on the personalized authorization profile when coupling with different craftsman devices. The personalized authorization profile of a user can therefore be individualized differently for several different craftsman devices, i.e. it can define different usage rights, usage restrictions and/or usage prohibitions of a user with regard to different craftsman devices.

According to an exemplary embodiment, the token can have a detection means, in particular a camera, which is configured to detect processing information indicative of a processing task to be carried out by means of the craftsman device, whereby the processor is configured to carry out the processing task using the detected processing information. For example, an optical detection means of the token can be used to recognize which fastener (e.g. an M8 screw) a user wants to insert into a surface using a craftsman device designed, for example, as a cordless screwdriver. The processor of the token can then adapt the operating mode of the craftsman device to the recognized information, for example by setting a torque accordingly. It is also possible that the (e.g. optical) detection information is not provided by the token but, for example, by a camera of the craftsman device or by a camera of a user terminal (e.g. a cell phone) that a user carries with them (and can optionally also be used for user-defined control of a token).

According to an exemplary embodiment, the token can comprise a mechanical coupling means which is configured for mechanical coupling with different craftsman devices, wherein the token is configured to control said craftsman device by means of the processor when the mechanical coupling means is mechanically coupled with a craftsman device. In the context of the present application, a "mechanical coupling means" can be understood in particular as a physical structure or a form factor of the token which can be coupled, for example in a form-fit and/or friction-fit manner, to a corresponding physical structure of a craftsman device, in order to thereby form a mechanical connection, in particular a temporary and well-defined mechanical connection, between the token and the craftsman device. For example, the token can be inserted into a correspondingly shaped receiving opening of the craftsman device in order to mechanically couple the token and the craftsman device. In this case, the mechanical coupling means can be configured to simultaneously establish a communicable coupling between the token and the craftsman device simply by forming a mechanical coupling with a hand-held tool. The formation of a mechanical coupling between a craftsman device and a token can be interpreted by the processor of the token as a request from the user to operate the craftsman device and can trigger a comparison of a personalized user profile of the user with the mechanically coupled craftsman device. This trigger logic allows the authorization comparison to be carried out quickly and with a high level of user convenience and the use of the craftsman device to be enabled by the user if the personalized user profile allows this.

According to an exemplary embodiment, the mechanical coupling means can be configured to couple the token detachably from the craftsman device. In this way, a user who wishes to use a craftsman device can mechanically couple a token assigned to him to the craftsman device and remove the token from the craftsman device again at the end of use in order to subsequently use the token in combination with another craftsman device. The craftsman device can be configured to allow control of the craftsman device by the token or use of the craftsman device only during the existence of a mechanical coupling with a token.

According to an exemplary embodiment, the mechanical coupling means can have an electromechanical interface, in particular an electromechanical interface that is universal for different craftsman devices. An electromechanical interface can be understood here to mean that the formation of a mechanical connection between the mechanical coupling means of the token and a corresponding mechanical receiving or connecting device of the craftsman device simultaneously leads to the formation of an electrical coupling between the token and the craftsman device. In this case, a positive coupling of the token and the craftsman device, for example, can also enable the transmission of an electrical control signal from an electrical contact of the token to an electrical contact of the craftsman device. This type of craftsman equipment is particularly robust in operation.

According to an exemplary embodiment, the token can be configured to form a communication connection, in particular a contactless or contact-based communication connection, with the craftsman device when the mechanical coupling means is mechanically coupled to a craftsman device. With reference to the exemplary embodiment described above concerning an electromechanical coupling between token and craftsman device, contact-based electrical communication between token and craftsman device can preferably only be made possible when the mechanical connection is formed. This allows a user to retain control sovereignty through an intuitive connection process. Alternatively, a contactless communication link between the token and the craftsman device can only be established by forming a mechanical coupling between the token and the craftsman device. For example, a wireless transponder (e.g. an RFID tag) of the token can only be brought into a readable distance of a transponder reader (e.g. an RFID reader) of the craftsman device by inserting the token into the craftsman device. This can be achieved, for example, by using a short-range communication protocol (e.g. NFC, near field communication) for wireless communication between the token and the craftsman device.

According to an exemplary embodiment, the craftsman device can have a memory means for storing the authorization profile. In particular, the memory means of the craftsman device can be communicably coupled with the token, in particular in order to store the authorization profile in the memory means by means of the token and/or to download it from the memory means. In this way, an authorization profile can also be stored in the craftsman device, to which a token can gain access (for example, triggered by mechanically coupling the token to the craftsman device). This can reduce the hardware resources of the token, as it can also download a data set with a user's personalized authorization profile from a craftsman device.

According to an exemplary embodiment, the craftsman device can be configured as a motorized or electric hand-held tool from a group consisting of a drill, a cordless screwdriver, a cordless drill driver, a rotary screwdriver, a pulse screwdriver, a ratchet screwdriver, an impact screwdriver, in particular a cordless impact screwdriver, and a hammer drill.

According to an exemplary embodiment, the craftsman equipment may comprise a plurality of craftsman devices, at least some of which are configured to interact with the token. Preferably, a craftsman equipment may include a plurality (in particular at least ten, further in particular at least one hundred) of craftsman devices and a plurality of tokens (in particular at least ten, further in particular at least one hundred) for managing usage rights of a plurality of users (in particular at least ten, further in particular at least one hundred). The described system is easily scalable and can also be used with the most complex machine parks in an error-resistant manner.

According to an exemplary embodiment, the craftsman devices can comprise at least two different elements from a group consisting of an electric or motorized hand-held tool (for example a drill), a tool (for example a drill or a screwdriver) or a tool set (for example a drill set in a drill box), a storage system (for example a case or a tool box), a consumable (for example a bolt anchor or a box of dowels) and a vehicle (for example a passenger car or a forklift). According to a preferred exemplary embodiment, several hand-held tools, several tools, several storage systems, several consumables and several vehicles can be managed as craftsman equipment. According to a configuration with a plurality of tokens and a plurality of craftsman devices of different types, in which a respective token can be mechanically coupled with any craftsman device and thus brought into functional connection, a complex and arbitrarily scalable system is created that enables efficient and reliable management of even a large number of craftsman devices. By allowing communication between a respective token and a craftsman device mechanically coupled to it and/or communication between different tokens and/or at least one other node in an associated communication network, even a huge, diversified and spatially decentralized system of craftsman devices (e.g. a machine park or craftsman equipment of a company) can be managed in an error-resistant, reliable and misuse-proof manner.

According to an exemplary embodiment, the processor can be configured to allow the user to use the craftsman device only after the user has verified that he is wearing a work protection means prescribed for the use of the craftsman device. In particular, the processor can be configured to detect the work protection means by sensors, in particular by means of a camera of the token and/or the craftsman device and/or by communicating with a communication means or a token of the work protection means. Without positive proof—in particular proof detected by sensors or documented by a communication message—that the work protection means required for the operation of a craftsman device is being worn by a user, the operation of an associated craftsman device can be deactivated. For example, a camera on the token, the craftsman device or a user terminal can be used to detect whether the user is wearing the work protection means in question. It is also possible for the work protection means to be provided with a further token that can communicate wirelessly with the token on a craftsman device and thereby verify the presence of the work protection means by means of a communication message.

BRIEF DESCRIPTION OF THE DRAWINGS

In the following, exemplary embodiments of the present invention are described in detail with reference to the following figures.

DETAILED DESCRIPTION

Figure 1:
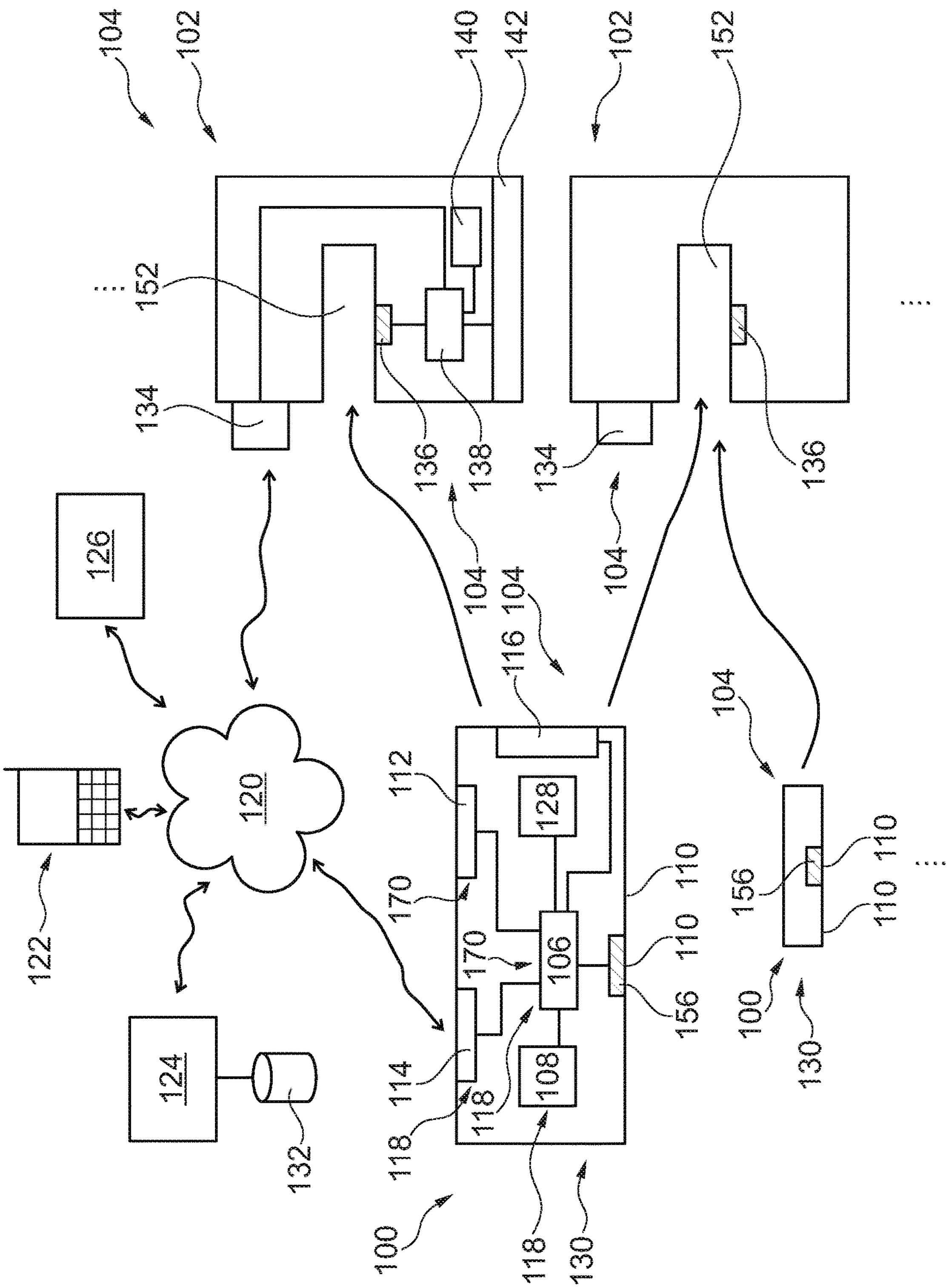
FIG. 1 shows a craftsman equipment with craftsman devices and tokens according to an exemplary embodiment of the invention, which are coupled in a communication network with additional communicable nodes.

Identical or similar components in different figures are marked with the same reference numbers.

Before exemplary embodiments of the invention are described with reference to the figures, some general aspects of embodiments of the invention will be explained.

According to an exemplary embodiment, a token can be used for use with a craftsman device (for example, a machine tool).

For example, the token can be provided with a combined electrical and mechanical structure. More precisely, different tokens of a token arrangement can have a common basic electrical and/or mechanical structure, but can also differ in terms of a variable additional electrical and/or mechanical structure. As fixed constituents, different tokens of a token arrangement can have a processor (which can, for example, also perform post-processing and/or data compression tasks), a communication means and a cryptographic unit (in particular a decrypter). A variable proportion of different tokens in a token arrangement may, for example, have differences with regard to at least one transmit/receive unit, at least one antenna and/or at least one sensor. A respective token may be formed as an object that may have a packaging component, one or more slots, compatibility with a battery, and/or a conductor adapter. It is also possible for a token to be supplied with electrical power from an external source. According to an exemplary embodiment, a token system can perform (in particular indirect) control of a craftsman device using an authorization concept, in particular using a personalized authorization concept.

Tokens in a token arrangement can have different degrees of functionality and can therefore be assigned to different generations. For example, a token with a first level of functionality can be equipped with limited sensors (e.g. only a temperature sensor and a vibration sensor) in terms of processing and communication as a BLE-capable token. Such a token can be used, for example, to download data sheets from a central node of a communication network. The execution of a processing task using a craftsman device assigned to a token can be made dependent on a current ambient temperature, for example. For example, the setting of a chemical dowel can only be allowed if a minimum processing temperature is ensured. A second-generation token can, for example, be configured as an ultra-wideband token in terms of processing or communication, which can also be equipped with a gyro sensor. For example, such a gyro sensor can detect when a hand-held tool (such as a drill) falls to the ground and can then automatically switch off the hand-held tool. A third-generation token can also be equipped with NB IoT (Narrow Band Internet of Things) functionality and a GPS sensor. A third-generation token can therefore be able to determine the location of the token and a mechanically coupled craftsman device and only allow permission to operate the craftsman device if the determined location is approved for the intended operation of the craftsman device. For example, the commissioning of an excavator can only be approved if the excavator is located on a specific construction site. This provides protection against misuse.

According to an exemplary embodiment of the invention, a token forms a basic unit of a system for the controlled operation of craftsman devices. Such a token can have a fixed component (in particular with microcontroller, decrypter), which can be contained in each token of a token arrangement. Furthermore, each token of a token arrangement can enable an electromechanical connection to craftsman devices (in particular, provide one or more electrical contacts for electrical coupling with a craftsman device). In addition, tokens of a token arrangement may have a variable portion, which may be different for different tokens. Such a variable portion may include equipping a token with one or more sensors (for example, fingerprint sensor, gyroscope, GPS sensor, UWB sensor, temperature sensor), at least one radio chip (for example, configured according to Bluetooth Low Energy, Bluetooth, NB-IoT, LTE Cat. M, 5G, NFC) and/or at least one antenna (for example configured according to 2.5 GPS, BLE, UWB, NB-IoT). Optionally, a token can be equipped with its own power supply, for example a battery or rechargeable battery.

One or more tokens with the described properties can form part of a system of craftsman equipment, which can also include craftsman devices (such as cordless drills, tools, cases, shelves, etc.). Software components (for example an IoT cloud software, an app, etc.) can also be part of such a system.

Preferably, a token according to an exemplary embodiment of the invention has a mechanical coupling means, which can be configured as an electromechanical coupling. This mechanical coupling means can be plugged onto or into electromechanical couplings of craftsman devices (such as hand-held tools, tools, cases, shelves, etc.). It is also possible to attach a mechanical coupling means of a token to or in a housing provided for this purpose (for example, a tracker) or to or in other devices (for example, a device for filling empty spray cans and the like).

During operation, a token can communicate with the craftsman device or other device into which the token is inserted. In this way, a token can determine on or in which object the token is inserted. A uniform bus is therefore advantageous for all objects. This ensures that in a complex system of a craftsman equipment (for example a machine park or craftsman equipment of a company) each token can be brought into mechanical and communicative connection (in particular control connection) with each craftsman device. In more general terms, all of the craftsmen devices in a craftsmen equipment can be equipped with a mechanically identical mechanical connection means, all of which enable optional coupling with the same token. In other words, the token can be plugged into all these items as a module.

According to an exemplary embodiment, a token can transmit documents and/or control signals to the craftsman device (for example, a cordless drill) into which the token has been inserted. Alternatively or additionally, it is possible for a token to download documents relating to an additional device (e.g. a tool, an adapter, etc.) connected to a hand-held tool. A token can also download documents relating to a workpiece to be processed with a craftsman device (for example a concrete anchor) and thus control the craftsman device accordingly (for example controlling a speed for drilling and/or screwing in a concrete anchor).

Preferably, a token can download authorizations for a craftsman device (e.g. a hand-held tool, tool, case, shelf, etc.) so that the craftsman device can only be operated in a specific spatial area (e.g. drilling machines only on a construction site). For example, a GPS sensor can be implemented in the token or associated craftsman device to provide up-to-date location information.

In particular, a token according to an exemplary embodiment of the invention can download authorizations for a craftsman device (for example, a hand-held tool, tool, case, shelf, etc.) so that the craftsman device can only be used or operated by certain persons (for example, only instructed personnel). In particular, the token can download authorizations for the craftsman device so that the craftsman device can only be operated with certain personal protective equipment.

A token can control a mechanically coupled craftsman device, for example switching a vacuum cleaner on or off. For example, when a drill is switched on, the token can also trigger the switching on of a drill dust extractor, so that a user does not need another hand to switch on an associated vacuum cleaner.

According to an exemplary embodiment, a token can be equipped with an optical sensor (for example a camera or a laser scanner) to identify a product or a body (for example a wall or a screw) that is processed with a craftsman device.

It is also possible for the token to download product information about the product from a node of a communication network that is connected to it in a communicable manner. The token or a craftsman device mechanically coupled to it then knows how the product is to be processed, for example what torque is to be applied.

According to an exemplary embodiment of the invention, an e.g. user-related token for providing, finding and/or processing a personalized authorization profile of the user can be checked with respect to the use of craftsman devices referred to in the personalized authorization profile. In this authorization profile, access or usage rights and their limits can be regulated based on personal or physical attributes, qualifications and/or restrictions of the user. After (in particular sensory) identification of a user, the user's personalized authorization profile can be identified and analyzed to determine whether it allows the use of a specific craftsman device. This craftsman device can be selected by a user by establishing a mechanical link between the user's token and this craftsman device. The use of a craftsman device can advantageously only be prevented once it has been verified for the identified user on the basis of the personalized authorization profile that the user is authorized to use this craftsman device. It is also possible to allow only limited or conditional use of such a craftsman device.

According to an exemplary embodiment of the invention, a craftsman equipment, i.e. components of a craftsman's working environment, can be efficiently managed with respect to a user's access rights to said components. Said components may include, in particular, hand-held tools, tools, cases, shelves and the like. Each of these components can be equipped with an electromechanical interface for a token, so that a respective token can be removably inserted into the electromechanical interface of each component. Each token preferably has an electromechanical interface for connection to a respective electromechanical interface of a respective one of the components. Advantageously, a respective token can communicate with an associated component so that the token knows in which component it is inserted and to which component it is therefore currently assigned. The token can control, in particular activate and deactivate, the component assigned to it by forming a mechanical coupling. In this context, it is possible that the token contains information regarding authorizations for a respective component or can load these via a communication network (for example from the Internet or an intranet). Advantageously, components can have an identification interface for identifying a user of the component. A respective token can also download documents via a communication network (in particular from the Internet or an intranet) for controlling and the like the component assigned to the token, accept them from an app or accept them from a transponder or tag. Advantageously, the token can have a wireless connection to the communication network (in particular the Internet or an intranet) (for example a WLAN antenna, a SIM card, etc.).

A respective token can have a communicative connection to a respective craftsman device (for example a hand-held tool, a tool, a case, a shelf, etc.), which can be realized in particular via a contactless radio connection or a contact-based electrical line connection. Advantageously, a token can be plugged into a respective craftsman device in a modular, interchangeable manner. For this purpose, a token can advantageously have an electromechanical interface, which can be the same for all tokens of a craftsman equipment.

According to an advantageous exemplary embodiment, a token can download documents from a communicatively coupled node, which can be used, for example, as a basis for controlling a craftsman device mechanically coupled to the token. A token according to an exemplary embodiment of the invention can load authorizations in a user system for craftsman devices and the like from a cloud and lock or suitably control craftsman devices and the like. It is also possible that the token can store authorizations for a craftsman device on the craftsman device itself (for example, using a fingerprint sensor). A user can store fingerprints directly on a module.

According to an exemplary embodiment of the invention, the token can have different degrees of functionality in different variants. For example, a token of a first generation can only support communication according to Bluetooth and only have a temperature sensor and a vibration sensor with regard to its sensor technology. In addition to a first-generation token, a second-generation token can also support WLAN communication and also have a gyroscope in terms of its sensors. In addition to a second-generation token, a third-generation token can support communication using a SIM card and have a GPS sensor. In addition to a third-generation token, a fourth-generation token can have a fingerprint sensor and an app for connecting to devices, a cell phone, etc. as additional equipment.

According to one embodiment of the invention, a token can be in communication with an app, for example to recognize a tool (for example a drill) and a workpiece (for example a concrete anchor) and to control and process them accordingly.

It is possible to implement an identification means or identification interface via an electronic chip in clothing (for example in a glove, in a shoe and/or in a helmet), via an electronic chip in the body, via one or more separate tags or keys' via a cell phone and/or via an app.

Advantageously, a token can enable anti-theft protection, since according to an exemplary embodiment of the invention, identification of a user and verification of the authorization of the identified user on the basis of a personalized authorization profile can be made a condition for commissioning the craftsman device. For example, a token can be equipped with a fingerprint sensor, a face recognition sensor or the like to identify a user. It is then possible to enable operation of a craftsman device (e.g. a machine) only with appropriately approved tokens.

A personalized authorization profile can be stored on a token. Alternatively or additionally, a personalized authorization profile can be stored in a cloud. In this case, a token can download a personalized authorization profile relating to a user and a craftsman device to be put into operation (for example, tools and/or hand-held tools). The token can save a personalized authorization profile after each download so that it is available offline. A personalized authorization profile can alternatively or additionally be stored in a craftsman device (in particular in a machine or in a battery). A token can then identify itself on a craftsman device (in particular a machine and/or a battery).

According to exemplary embodiments of the invention, it is advantageous if an authorization profile also comprises user-specific data. For example, if a machine is too heavy for a particular user, this machine can be blocked for this user.

Advantageously, a token according to an exemplary embodiment of the invention can be plugged into a tracker. In this way, the current position of a respective token can be determined, for example if a token assigned to a tracker can communicate with mobile radio devices in its vicinity and corresponding information is transmitted by the mobile radio devices, for example to a central control means. In this way, it is possible to track the location of each token and therefore each assigned craftsman device. A tracker can be attached to a craftsman device (for example a hand-held tool or any other machine), for example by gluing, a magnetic connection or by mechanical latching. In particular, a token can be inserted into a tracker. A tracker can also be equipped with a power supply device (for example a battery) and one or more antennas (in particular for communication according to RFID and/or WLAN and/or Bluetooth).

FIG. 1 shows a craftsman equipment 104, for example a workshop equipment or a machine park or craftsman equipment of a company, with craftsman devices 102 and tokens 100 according to an exemplary embodiment of the invention, which are coupled in a communication network 120.

More specifically, the craftsman equipment 104 comprises a plurality of tokens 100, which may, for example, all be shaped and dimensioned in the same way. In FIG. 1, only two such tokens 100 are shown, but a much larger number of tokens 100 is possible in a craftsman equipment 104 (for example at least ten, in particular at least one hundred).

In addition, a plurality of craftsman devices 102 are provided in the craftsman equipment 104. FIG. 1 shows only two such craftsmen devices 102, but a much larger number of craftsmen devices 102 is possible in a craftsman equipment 104 (for example at least ten, in particular at least one hundred). Some or all of the craftsman devices 102 may include an identically shaped and dimensioned mechanical receiving means 152, here formed as an insertion or receiving aperture configured to mechanically couple with a respective mechanical coupling means 110 of any user-selected one of the tokens 100. A positive connection can be formed between each mechanical coupling means 110 of each token 100 and each mechanical receiving means 152 of each craftsman device 102 by plugging them together.

When a mechanical connection is formed between a token 100 and a selected craftsman device 102 by inserting the mechanical coupling means 110 of the token 100 into the receiving means 152 of the selected craftsman device 102, an active or communication connection is simultaneously formed between the token 100 and the craftsman device 102. More specifically, in the illustrated exemplary embodiment, an electrical connection is formed between one or more electrical contacts 156 on an exterior of each token 100 and one or more electrical mating contacts 136 on an interior of each receiving means 152 of each craftsman device 102. The formation of a positive fit between a respective token 100 and a respective receiving means 152 of a craftsman device 102 thus leads to the formation of an electrical contact and thus an electrically conductive connection between the token 100 and this craftsman device 102. This electrical connection also forms an electrical communication connection between the token 100 and the craftsman device 102, which in particular enables the transmission of electrical signals (for example control signals). As an alternative to this contact-based electrical coupling, a wireless or contactless communication link can be formed between a token 100 and a craftsman device 102 by inserting the token 100 into the receiving means 152 to bring a transponder (for example, an RFID tag, not shown) of the token 100 within a readability distance of a transponder reader (for example, an RFID reader, not shown) of the craftsman device 102 (not shown).

Advantageously, a token 100, if it has been brought into communication with the craftsmen device 102 by insertion into the receiving means 152 of a craftsmen device 102, is configured to control this craftsmen device 102. Operation of the craftsman device 102 in a state without coupling with the token 100 can be prevented. In other words, the use of the token 100 and the craftsman device 103 can only be enabled once the token 100 and the craftsman device 103 have been successfully coupled.

By allowing each token 100 to be selectively coupled to each mechanical receiving means 152 of a selected craftsman device 102, a flexibly combinable, modular system for operating, controlling and/or managing craftsman devices 102 in a complex craftsman equipment 100 is provided.

In FIG. 1, the craftsman devices 102 are only partially and only schematically shown. For example, a first part of the craftsman devices 102 may be configured as electric or motorized hand-held tools, for example as electric drills, electric cordless screwdrivers, etc. Craftsman devices 102 configured as electric or motorized hand-held tools can, for example, have a functional means 134 which performs the actual function of the respective hand-held tool and can be driven by means of an electric or motorized drive. In the case of a craftsman device 102 configured as a drill, the functional means 134 may, for example, be a drill chuck (in particular with a drill bit). In the case of a craftsman device 102 configured as a cordless screwdriver, the functional means 134 can be, for example, a bit holder (in particular with a bit). Furthermore, a hand-held tool may have a power supply device 142, for example a removable and rechargeable battery pack. Such a power supply device 142 can supply the functional means 134 with electrical drive energy during operation. Alternatively or additionally, the power supply device 142 may also supply a token 100 with electrical power when the token 100 is received in the receiving means 152. A hand-held tool may also include a control means 138, which may be configured to control the hand-held tool (for example, when a hand-held tool is not coupled to a token 100) and/or to interact with a processor 106 of a coupled token 100.

A second part (not shown) of the craftsman devices 102 may be formed as (in particular non-electric or non-motorized) tools or tool sets, for example as a screwdriver, drill or drill box, bit or bit box, etc.

A third part (not shown) of the craftsman device 102 can be configured as storage systems for storing hand-held tools, tools and consumables. Examples of such storage systems are boxes, cases, drawers and/or shelves for holding or storing hand-held tools, tools and/or consumables.

A fourth portion (not shown) of the craftsman devices 102 may be formed as a consumable item, such as boxes of screws or dowels, or as a bolt anchor.

A fifth portion (not shown) of the craftsman devices 102 may be formed as motorized vehicles, for example, cars or trucks, forklifts and/or excavators, such as those used in performing hand tasks. Non-motorized vehicles driven by muscle power, such as a pushable tool trolley, can also be used.

A sixth portion (not shown) of the craftsman tools 102 may be formed as other tools and implements of the craftsman equipment 104, such as ladders, scaffolding, etc.

A portion or each of the described craftsman devices 102 may be temporarily or permanently equipped with a token 100.

Advantageously, the craftsman devices 102 for coupling with the tokens 100 are configured such that a use of a craftsman device 102 coupled with a token 100 can be allowed, set and/or prevented by a user based on a personalized authorization profile. More specifically, a user of a token 100 may be assigned a user profile that may include information with respect to an enablement and authorization of that user to use certain craftsman devices 102, but may also define usage restrictions and/or usage prohibitions with respect to certain craftsman devices 102. Such a user profile may be stored in a memory means 128 of a token 100, in a memory means 140 of a craftsman device 102 and/or in a database 132 of a node (in the illustrated exemplary embodiment a central control means 124, alternatively another node) communicably coupled to the token 100 via a communication network 120.

The structure of the token 100, which is shown in detail in FIG. 1, is described in more detail below as an example. Said token 100 is used, for example, for user-related control of a selectable one of the craftsman devices 102 of the craftsman equipment 104 and has a processor 106 for this purpose. For example, the processor 106 may be embedded inside the token 100 and thereby protected. The processor 106 may, for example, be in the form of a microprocessor. It is possible to form the processor 106 as part of a processor unit, as an entire processor unit or as a plurality of interacting processor units. The processor 106 of the token 100 is used for control-related interaction with different craftsman devices 102 of the craftsman equipment 104, and in particular interacts functionally with a selected craftsman device 102 into whose receiving means 152 the token 100 is inserted.

Furthermore, the token 100 includes a cryptographic unit 108 that supports cryptographic communication of the token 100. More specifically, the cryptographic unit 108 can be used to encrypt a communication of the token 100 with a communication partner device in the communication network 120. For example, such encrypted communication supported by the cryptographic unit 108 can take place between the token 100 on the one hand and a central control means 124, a user terminal 122 and/or a reordering device 126 on the other hand. Encrypted communication increases data security during communication via the communication network 120. Optionally, it is also possible to use the cryptographic unit 108 to carry out encrypted communication between the token 100 and a craftsman device 102 mechanically coupled to it, for example when transmitting control signals from the token 100 to a craftsman device 102 being formed as a hand-held tool. This leads to secure control of a respective craftsman device 102, since a hacker attack or unauthorized control from outside can be prevented as a result.

As already mentioned, the token 100 has the mechanical coupling means 110, which is configured for preferably positive mechanical coupling with a receiving means 152 of a respective one of different craftsman devices 102 of the craftsman equipment 104. The mechanical coupling means 110 of the token 100 is defined by its outer shape, which is shaped inversely to the inner shape of a receiving means 152 of a respective craftsman device 102.

Advantageously, when the mechanical coupling means 110 is mechanically coupled to a receiving means 152 of a selected craftsman device 102, the token 100 may be configured to control the operation of said craftsman device 102 by means of the processor 106 (and optionally the cryptographic unit 108 using cryptographic communication). More specifically, the processor 106 of the token 100 may control the craftsman device 102 and, in particular, its functional means 134 such that the desired processing task is performed by the craftsman device 102 as intended. For example, the processor 106 of the token 100 may specify the torque to be applied by a drill bit of a craftsman device 102 configured as a drill to a substrate in which a borehole is to be drilled.

Advantageously, the token 100 can be configured for user-related control of the craftsman device 102, in particular on the basis of a personalized authorization profile of the user. For this purpose, the token 100 can be provided with an identification means 170, which is configured to identify a user of the token 100. The identification means 170 is formed by a sensor 112, configured for example as a fingerprint sensor, and the part of the processor 106 that identifies the user from sensor data determined by means of the sensor 112, for example by pattern matching with reference data. More precisely, the sensor 112 is designed, for example, as a fingerprint sensor on which a user places a finger for identification. Advantageously, the sensor 112 can therefore be located in a surface area of the token 100. The sensor 112 can then determine whether the data recorded by the sensor 112 indicates that the user is an authorized or authorized user or which user it is. This determination can be made by comparing the sensor-detected data with sensor reference data (for example, a fingerprint of an authorized user stored in a database).

The aforementioned memory means 128 of the token 100 may store information indicative of, or providing access to, a personalized authorization profile of the user with respect to the craftsman device 102. More specifically, the memory means 128 of the token 100 may store a set of data representing or mapping an authorization profile of a user (or multiple authorization profiles of multiple users). However, it is also possible that the authorization profile of one or more users is stored in an entity remotely located with respect to the token 100, for example in a central database 132 of a central control means 124, through which the token 100 may be communicably coupled by means of the communication network 120. To access an authorization profile of a user, it may then be sufficient to store access information (for example, a link to the central database 132, possibly in combination with a password) in the token 100 to access the remotely stored authorization profile.

The processor 106 may be configured to control the operation of the craftsman device 102 coupled to the token 100 in accordance with the user authorization profile of the user of the token 100. In particular, the processor 106 may be configured to enable the operation of the craftsman device 102 coupled to the token 100 only if a user identification performed in advance by means of the token 100 has led to the result that an identifying user is authorized to operate the craftsman device 102. Advantageously, the processor 106 of the token 100 can thus be configured to allow, set and/or prevent use of the craftsman device 102 by the user based on the personalized authorization profile when coupled to the craftsman device 102. For example, a processing task desired by a user using a craftsmen device 102 may only be allowed for certain users, for example if the user has received specific instruction or has received a special qualification (for example a driver's license) to use the craftsmen device 102. If the authorization profile of the user does not meet such a condition, the use of the craftsman device 102 can be prevented by the processor 106 of the token 100. However, if the authorization profile of the user meets such a condition, the use of the craftsman device 102 can be allowed by the processor 106 of the token 100. If certain processing tasks are only allowed to a limited extent for a user due to an authorization profile, the use of the craftsman device 102 by the user is only allowed if an associated condition is met. For example, the use of a craftsmen device 102 by a user may only be authorized if the user is wearing protective equipment (for example, safety goggles). If such protective equipment is also visible with a token 100, the processor 106 can search for a communicably coupled token 100 indicating protective equipment and only allow the desired processing task by a user when the presence of protective equipment has been recognized by the presence of such a token 100.

As shown in FIG. 1, the craftsman equipment 104 may include a token arrangement 130 comprising a plurality of tokens 100, wherein different ones of the tokens 100 have different degrees of functionality. For example, the tokens 100 of a craftsman equipment 104 may be divided into tokens 100 of a first, second, and third generation. Each token 100 of any generation may thereby fulfill the basic function of a token 100, as described above. Tokens 100 of higher generations may furthermore have additional functions and/or additional convenience, but also support the basic function of a token 100 of the lowest generation. Tokens 100 of all generations may have the same form and may be used for use with any of the craftsman devices 102 of the craftsman equipment 104. In other words, the token arrangement 130 is compatible with respect to different generations of tokens 100. The craftsman devices 102 require no adaptation with respect to their interaction with a token 100 of a respective generation, except that a receiving means 152 is provided for mechanically receiving an associated token 100.

Each of the inserted tokens 100 can, for example, be configured as a plug-in element for insertion into a receiving opening of a craftsman device 102. For example, each token 100 may be formed as a circular disk with a diameter in a range of 2 cm to 4 cm and is therefore convenient for a user to handle and insert into a craftsman device 102 in a space-saving manner. Other shapes of a token 100 are possible, see for example FIG. 3. Furthermore, the mechanical coupling means 110 of each token 100 is configured to detachably couple the token 100 to the craftsman device 102. Thus, a user can use a token 100 (assigned to him, for example) successively in combination with different craftsman devices 102, wherein the selection of an addressed craftsman device 102 can be made by merely mechanically inserting the mechanical coupling means 110 of the token 100 into an associated receiving means 152 of a target craftsman device 102. Thus, the mechanical coupling means 110 of a token 100 serves as a universal electromechanical interface for different craftsman devices 102.

As already mentioned, the token 100 may comprise one or more sensors 112, including the user identification sensor described above. It is alternatively or additionally possible to equip the token 100 with, for example, a gyro sensor, a location sensor and/or a temperature sensor. A gyro sensor can detect, for example, when a craftsman device 102 with a token 100 accommodated therein falls down and is consequently subjected to a shock. In this case, the craftsman device 102 can be switched off as a precaution to prevent injury to a user and damage. A location sensor (for example a GPS sensor) of the token 100 allows the current position of the token 100 together with the craftsman device 102 to be detected. The use of a craftsman device 102 can be restricted (for example in a user profile) to a specific room area (for example a specific construction site), for example to prevent misuse. If a location sensor detects that a craftsman device 102 together with the token 100 is located in a location not authorized for use, the processor 106 of the token 100 can switch off or deactivate the craftsman device 102 to prevent misuse. A temperature sensor of the token 100 can detect the ambient temperature. If a processing task (for example, setting a chemical dowel) is only allowed under certain temperature conditions, operation of the craftsman device 102 can be made impossible for safety reasons if a temperature condition is not met in view of the temperature sensor data detected.

Optionally, the token 100 has a power supply device 116, for example a replaceable battery or a rechargeable battery. The token 100 can then be operated autonomously. Alternatively or additionally, the token 100 can be supplied with electrical energy by a power supply device 142 of a craftsman device 102 when the token 100 is received in the receiving means 152.

FIG. 1 further shows that the token 100 can have a communication antenna 114, for example a WLAN antenna. It is also possible and advantageous for reasons of diversity if the token 100 has several communication antennas 114 which, for example, support different communication protocols. For example, a communication antenna 114 may be realized in the form of a planar coil, which is preferably arranged in a surface area of the token 100. A communication antenna 114 may be formed as a transmit/receive antenna. It is also possible to provide a transmitting antenna and a separate receiving antenna, or only one of these antennas.

In addition, the token 100 shown in FIG. 1 has a communication means 118, which can be formed by interaction of the communication antenna 114 with a corresponding part of the processor 106 and optionally with the cryptographic unit 108. The communication means 118 is used for communicating the token 100 with one or more communication nodes via the communication network 120, which may be, for example, the public Internet, an intranet or a mobile network.

For example, the token 100 may communicate via the communication network 120—or directly—with another token 100 of the craftsman equipment 104. This may be done, for example, for the purpose of recognizing the presence of protective equipment equipped with a token 100 (which may be made a condition for enabling the use of a workman's tool 102 for work safety reasons).

Alternatively or additionally, it is possible to form a communicable coupling between the token 100 and an app or other software stored on a portable user terminal 122 via the communication network 120. In the illustrated exemplary embodiment, the user terminal 122 is a mobile device with a user interface with which a user can control and/or monitor the communicably coupled token 100 and/or a craftsman device 102 coupled thereto. By means of the user terminal 122, a user can control and/or monitor the craftsman equipment 104 even from a remote position. For example, a token 100 can connect via an app to the user terminal 122 configured here as a mobile communication device. By means of the user terminal 122, data can be downloaded to the token 100, for example a user profile of a user of the user terminal 122. Furthermore, it is possible for the token 100 to access resources of the user terminal 122 during operation, for example a processor contained therein and/or a camera of the user terminal 122.

For example, a camera included in the user terminal 122 may be used to capture an image of a product package that provides an inference of a consumable used for a machining task (for example, a type of screw). This information can be communicated from the user terminal 122 to the token 100 so that control of a craftsman device 102, for example, configured as a cordless screwdriver, to set a corresponding screw can be performed accordingly by the token 100. In more general terms, for example, an optical detection means, in particular a camera, can be provided on the token 100 and/or on the user terminal 122, which is configured to detect processing information indicative of a processing task to be carried out by means of the craftsman device 102. Advantageously, the processor 106 may be configured to perform the processing task using the detected processing information.

Alternatively or additionally, it is possible to form a communicable coupling between the token 100 and a central control means 124 (for example, for controlling a plurality of craftsman devices 102) via the communication network 120. The central control means 124 may be provided with an access right to a database 132, from which data records can be transmitted to the token 100. Such data records may include, for example, a user profile requested by the token 100, an operational data record for performing a processing task with a craftsman device 102 mechanically coupled to the token 100, etc. Thus, the token 100 can be configured to download a data set by means of the communication means 118 from the central control means 124 or another node of the communication network 120 that is coupled in a communicable manner, in particular a data set defining an operating sequence of the craftsman device 102 and/or a data set defining a user profile of a user of the token 100.

Furthermore, the communicable coupling between the token 100 and the central control means 124 makes it possible to transmit data from the token 100 to the control means 124 for storage in the database 132. Such data may be, for example, tracking data that allows tracking of a craftsman device 102 coupled to a respective token 100. Thus, the token 100 can be configured to upload a data set by means of the communication means 118 to the control means 124 or another node of the communication network 120 that is coupled in a communicable manner, in particular a data set containing operating results and/or operating parameters of an operation of the craftsman device 102.

Finally, it is possible that the token 100 is coupled via the communication network 120 to a reordering device 126 for reordering consumables for operating a craftsman device 102. If a token 100 detects (for example by means of a token's own, for example optical, sensor 112 and/or by means of a camera image of the user terminal 122) that a remaining stock of a certain consumable (for example a certain type of screw for setting into a substrate by means of a craftsman device 102 configured as a cordless screwdriver into which the token 100 is inserted) has fallen below a critical threshold value, the token 100 can inform the reordering device 126 accordingly via the communication network 120 and thereby trigger or initiate a reordering of this consumable. The reordering device 126 can be a computer, which in turn can be coupled to supplier nodes via the communication network 120 in order to carry out the reordering. A reordering of consumables can thus be triggered by a token 100, for example if it has been detected by means of the token 100 and/or a craftsman device 102, for example by sensors, that a remaining stock of certain consumables has fallen below a predetermined threshold value.

During operation of the craftsman equipment 100, a user of the token 100 can first be identified by means of the sensor 112, which is configured as a fingerprint sensor, for user-related control of a craftsman device 102 by means of a token 100. Then, a mechanical coupling of the mechanical coupling means 110 of the token 100 with the mechanical connection means 152 of the selected craftsman device 102 can be performed. Before or after the mechanical coupling, a personalized authorization profile of the user of the token 100 can be found, for example in one of the memory means 128, 140. After the mechanical coupling has taken place, the craftsman device 102 can be controlled by means of the processor 106. Advantageously, use of the craftsman device 102 by the user can be allowed, prevented and/or set based on the personalized authorization profile. In particular, the processor 106 can be configured to enable operation of the craftsman device 102 coupled with the token 100 only if a user identification carried out in advance by means of the token 100 has led to the result that an identifying user is authorized to operate the craftsman device 102. Here, the personalized authorization profile may comprise at least one piece of information from a group consisting of a prohibition of use for at least one defined operating mode of the craftsmen device 102 based on a user qualification and/or on a physical (for example, a physical limitation) or biological (for example, an advanced age) user characteristic, a user-specific permission of use for at least one defined operating mode of the craftsmen device 102, and a condition of use for the use of the craftsmen device 102, for example, related to occupational safety. For example, the authorization profile for a specific user may include the information that the user is only capable of using craftsman devices 102 up to a certain weight (for example up to 20 kg) due to his physical constitution (for example due to his age, his height and/or his weight). Furthermore, in such an authorization profile for a particular user, it may be stored for which craftsmen devices 102 the user is authorized to operate (for example, a user may only be allowed to use a forklift if the user has a forklift driver's license). Furthermore, it can be stored in a user profile for a specific user and/or for a specific craftsman device 102 which occupational work protection means (e.g. protective overalls, ear muffs, safety goggles) must be worn by a user in order to be allowed to use a specific craftsman device 102. A user can be denied the use of a craftsman device 102 by the token 100 until the work protection means on this user has been recognized (for example by sensors). For example, the work protection means can also be equipped with a corresponding token 100, so that the presence of work protection means on the user can be verified by token-token communication.

The processor 106 may be configured to allow or prohibit a download of a data set (for example, a data sheet), in particular a data set defining an operation of the craftsman device 102, from a communication network 120 when coupled to the craftsman device 102 based on the personalized authorization profile. For example, an optical sensor (in particular, a camera) of the token 100 and/or on a craftsman device 102 may scan a product package of screws to be set in a substrate (for example, a vertical concrete wall) in an operational mode of the craftsman device 102. In this way, for example, it can be detected by sensors that the screws are M8 screws. The token 100 can then perform or initiate a download of a product specification (as a data set defining an operating sequence) corresponding to the sensor-detected product package. On the basis of the downloaded data set, the processing task can then be executed without errors, namely by controlling the craftsman device 102 by the token 100 using the downloaded data set.

Figure 2:
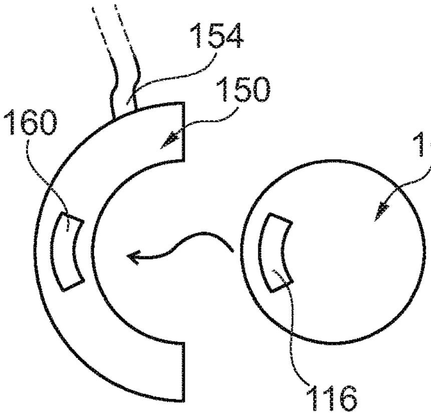
FIG. 2 shows a token with an associated storage and recharging device according to an exemplary embodiment of the invention.

FIG. 2 shows a token 100 with an associated storage and recharging device according to an exemplary embodiment of the invention.

More precisely, the token arrangement shown in FIG. 2 has the token 100 and a token holder 150, which can be configured to hold the token 100 in a form-fit and/or force-fit manner. For this purpose, the token 100 can be clamped in a receiving space of the token holder 150, which is delimited between opposing elastic legs of the token holder 150. In this way, a user can store the token 100 in a mechanically protected manner, for example by using a connecting element 154. By means of the connecting element 154, a user can carry the token holder 150, optionally together with the token 100 held therein, in a fixed manner, for example by attaching it to a belt loop.

It is also possible to attach a token 100 with a completely or partially discharged energy supply device 116 (for example a rechargeable battery) to the token holder 150 and thereby trigger a recharging of the energy supply device 116. For this purpose, electrical energy can be transferred (for example by an electrical contact or in an inductive manner) from a charging device 160 of the token holder 150 to the energy supply device 116 of the token 100.

Figure 3:
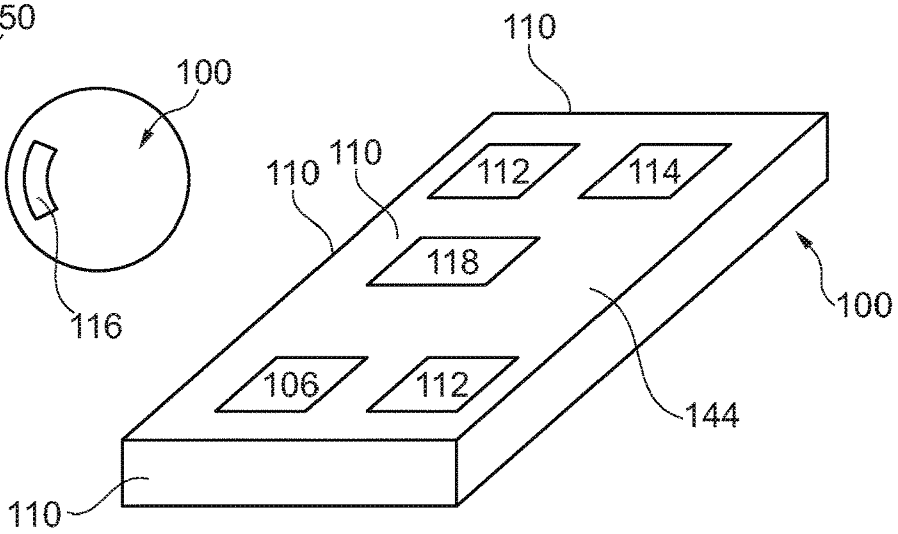
FIG. 3 shows a token according to an exemplary embodiment of the invention.

FIG. 3 shows a token 100 according to an exemplary embodiment of the invention. The token 100 according to FIG. 3 is formed as a rectangular strip that can be intuitively inserted into an inversely shaped recess in the interior of a craftsman device 102.

Figure 4:
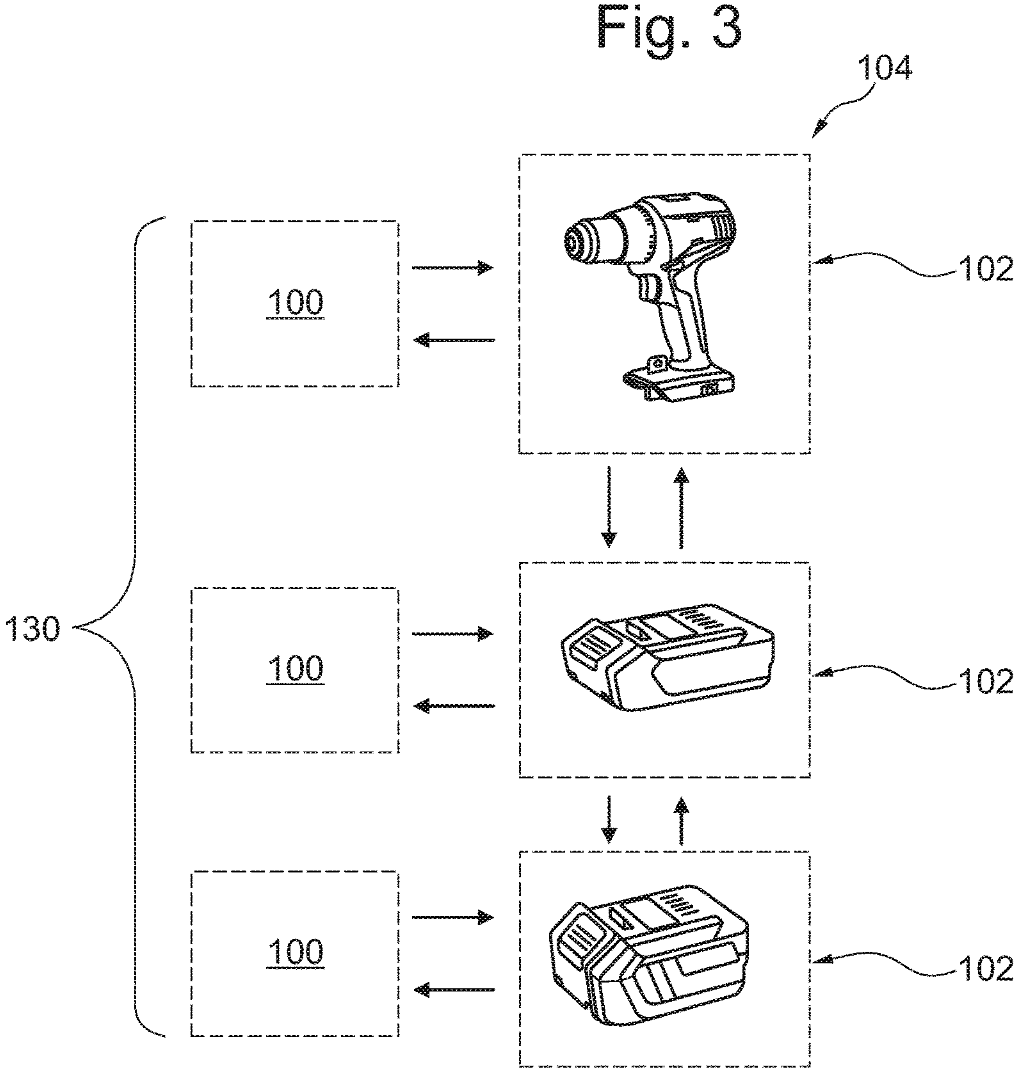
FIG. 4 shows components of a craftsman equipment according to another exemplary embodiment of the invention.

FIG. 4 shows components of a craftsman equipment 104 according to another exemplary embodiment of the invention.

The craftsman equipment 104 according to FIG. 4 includes, for example, three craftsman devices 102 and, for example, three tokens 100.

The three craftsman devices 102 shown in FIG. 4 are configured as a drill (top), sensor module (middle) and battery block (bottom) and can be connected to each other. During operation, the battery block supplies the drilling machine with electrical energy, while the sensor module detects operating data of the drilling machine by sensors (and uses these, for example, as a basis for a control system). Bidirectional signal coupling (i.e. in the direction of transmission and in the direction of reception) is possible between the drilling machine and the sensor module, see the two arrows. Similarly, bidirectional signal coupling is possible between the sensor module and the battery block.

Bidirectional signal coupling is also possible between each of the craftsman devices 102 and a respective one of the tokens 100. The configuration according to FIG. 4 shows that all components 102, 100 can communicate with each other on an equal footing. The communication interfaces between the components 102, 100 can, for example, be designed in accordance with a UART (Universal Asynchronous Receiver Transmitter) protocol.

The illustrated tokens 100 may form a token arrangement 130 of tokens 100 of varying degrees of functionality, wherein any of the tokens 100 of the token arrangement 130 may be mechanically and functionally coupled to any of the craftsman devices 102.

Figure 5:
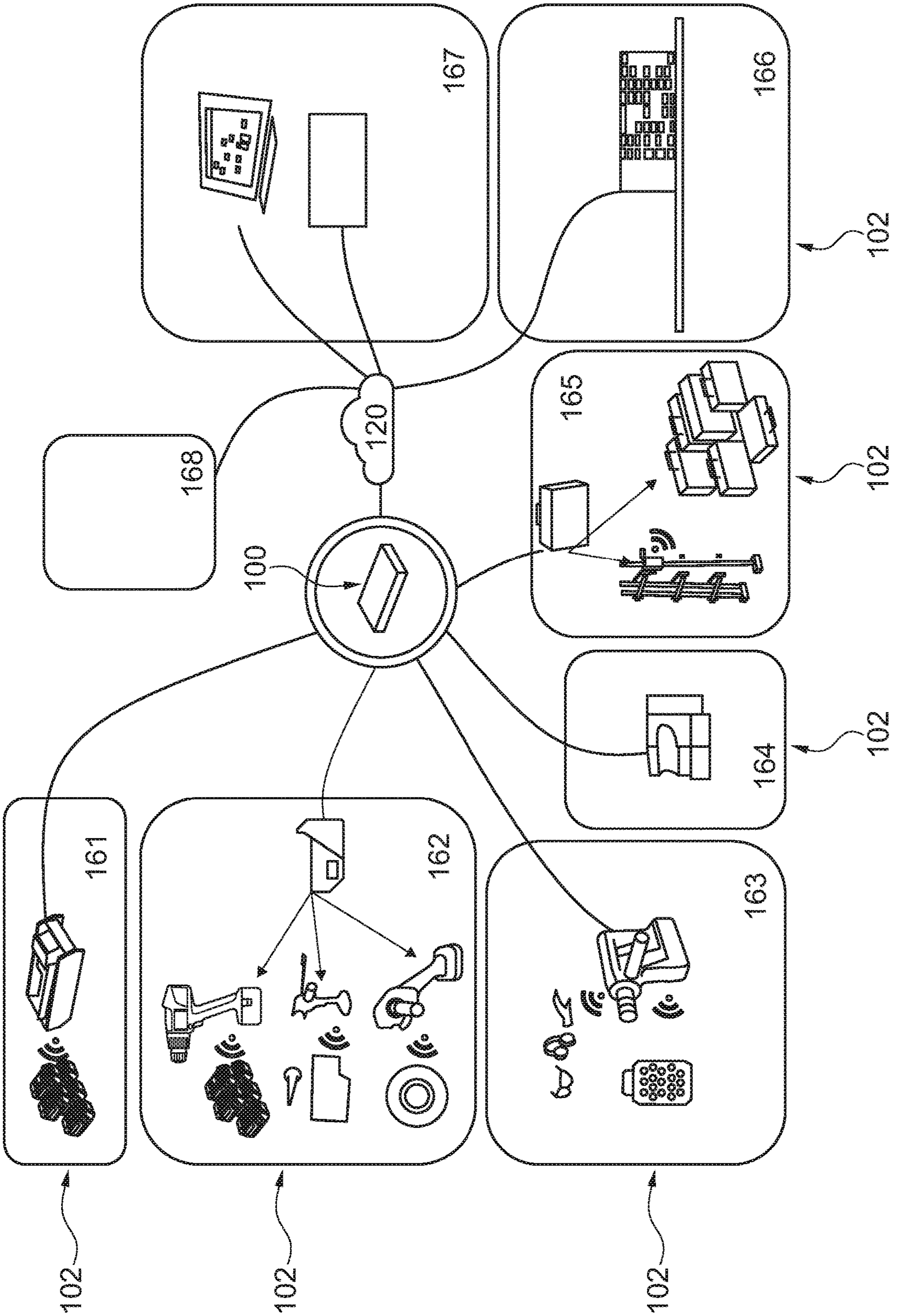
FIG. 5 shows a craftsman equipment with craftsman devices and a token according to an exemplary embodiment of the invention, which are coupled in a communication network.

FIG. 5 shows a craftsman equipment 104 with craftsman devices 102 and a token 100 according to an exemplary embodiment of the invention, which are coupled in a communication network 120. FIG. 5 shows a modular craftsman equipment 104 in an Internet of Things (IoT) architecture.

Reference mark 161 shows adapters, reference mark 162 shows hand-held tools, reference mark 163 shows personal protective equipment and wearables, reference mark 164 shows the applications of a third party craftsman equipment 164, reference mark 165 shows tracker elements, reference mark 166 shows stocking systems, reference mark 167 shows an inventory management system, and reference mark 168 shows an online store. All of these systems may be included in the token-controlled craftsman equipment 104.

Another application example of a token according to an exemplary embodiment of the invention is described below. At a predetermined time (for example, at a predetermined time of day, such as at the end of the working day), the token can transmit operating data to a target device or to a memory means (for example, to a cloud, an app stored on a portable user terminal, etc.). Such operating data may, for example, contain information regarding an identified user of the token and/or a craftsman device coupled with it. Furthermore, such operating data may contain the information that certain work steps have been carried out with said craftsman device on a certain day (in particular with the addition of additional information such as torque, speed and/or time).

According to another application example of another exemplary embodiment of the invention, communication can be carried out—in particular by means of a token—between a plurality of devices, in particular between a plurality of craftsman devices. For example, communication can be carried out between a first craftsman device (for example a master device) and a second craftsman device (for example a slave device). For example, a first craftsman device (for example, a drill) may turn on a second craftsman device (for example, a vacuum cleaner) when performing a drilling task. In another example, a core drill can communicate with a guide rail for guiding the core drill, for example to transmit current location information. It is also possible for a robot to communicate with an external device, for example to synchronize or ensure that the robot has positioned itself correctly in the room.

According to an exemplary embodiment of the invention, it is also possible to implement a token as a tracker in a craftsman device (for example in a power tool, a battery housing, etc.). This makes it possible to determine the location of the craftsman device. Optionally, at least one sensor or at least one further sensor can also be integrated into the token, for example a temperature sensor and/or a humidity sensor.

In addition, it should be noted that "comprising" does not exclude other elements or steps and "one" or "a" does not exclude a plurality. Furthermore, it should be noted that features or steps described with reference to one of the above embodiments may also be used in combination with other features or steps of other embodiments described above. Reference signs in the claims are not to be regarded as a limitation.

The invention claimed is:

1. A system comprising:

a token for user-related control of a craftsman device, the token comprising:

a processor which is configured for control-related interaction with the craftsman device;

an identification means configured to identify a user of the token;

a first memory means with stored information indicative of or allowing access to a personalized authorization profile of the user with respect to the craftsman device; and an energy device, wherein the processor is configured to allow, set and/or prevent use of the craftsman device by the user based on the personalized authorization profile when the token is coupled to the craftsman device;

the craftsman device which is configured for coupling with the token in such a way that use of the craftsman device coupled with the token by a user is allowed, set and/or prevented based on the personalized authorization profile;

wherein the craftsman device comprises a second memory means for storing the authorization profile, wherein the second memory means can be coupled to the token in a communicable manner in order to store the authorization profile in the second memory means by means of the token and/or to download it from the second memory means by means of the token; and a token holder for holding and carrying the token, the token holder being configured to hold the token in a form-fit and/or force-fit manner and to trigger a recharging of the energy supply device of the token by attaching the token with the completely or partially discharged energy supply device to the token holder.

2. The system according to claim 1, comprising a mechanical coupling means configured for mechanical coupling with different craftsman devices, wherein the token is configured to control a craftsman device by means of the processor upon mechanical coupling of the mechanical coupling means with the craftsman device.

3. The system according to claim 2, comprising at least one of the following features:

wherein the mechanical coupling means is configured to couple the token detachably from the craftsman device;

wherein the mechanical coupling means has an electromechanical interface, in particular a universal electromechanical interface for different craftsman devices;

wherein the token is configured to form a communication link, in particular a contactless or contact-based communication link, with the craftsman device when the mechanical coupling means is mechanically coupled to a craftsman device.

4. The system-according to claim 1, wherein the authorization profile of the user is stored in the first memory means.

5. The system according to claim 1, wherein the token comprises communication means configured to communicate by means of a communication network for obtaining the authorization profile of the user identified by the identification means using the access allowing information.

6. The system according to claim 1, wherein the identification means comprises a user-identifying sensor, in particular a fingerprint sensor or a face recognition sensor.

7. The system according to claim 1, wherein the processor is configured to compare a user identity determined by means of the identification means with the authorization profile and, based thereon, to control whether the use of the craftsman device by the user is allowed or prevented and/or how the use is set.

8. The system according to claim 1, wherein the personalized authorization profile comprises at least one piece of information from a group consisting of a usage prohibition related to a user qualification and/or to a physical or biological user characteristic for at least one defined operating mode of the craftsman device, a user-specific usage permission for at least one defined operating mode of the craftsman device, and a work safety-related usage condition for the use of the craftsman device.

9. The system according to claim 1, wherein the processor is configured to allow or prevent a download of a data set, in particular a data set defining an operation sequence of the craftsman device, from a communication network upon coupling with the craftsman device based on the personalized authorization profile.

10. The system according to claim 1, wherein the processor is configured to enable operation of the craftsman device coupled to the token only if a user identification carried out in advance by means of the token has led to the result that an identifying user is authorized to operate the craftsman device.

11. The system according to claim 1, wherein the processor is configured to allow, set and/or prevent a use of the craftsman device by the user in different ways based on the personalized authorization profile when coupling with different craftsman devices.

12. The system according to claim 1, comprising a detection means, in particular a camera, which is configured to detect processing information indicative of a processing task to be carried out by means of the craftsman device;

wherein the processor is configured to perform the processing task using the detected processing information.

13. The system according to claim 1, comprising at least one of the following features:

wherein the craftsman device is configured as an electric hand-held tool, in particular from a group consisting of a drill, a cordless screwdriver, a cordless drill driver, a rotary screwdriver, a pulse screwdriver, a ratchet screwdriver, an impact screwdriver, in particular a cordless impact screwdriver, a hammer drill, a corded hand-held tool and a compressed air-operated hand-held tool;

comprising a plurality of craftsman devices, at least some of which are configured to interact with the token, wherein in particular the craftsman devices comprise at least two different elements from a group consisting of an electrical hand-held tool, a tool or a tool set, a storage system, a consumable, and a vehicle;

wherein the processor is configured to allow use of the craftsman device by the user only when the user has verified that he is wearing a work protection means prescribed for use of the craftsman device, in particular by means of the token, wherein in particular the processor is configured to recognize the work protection means by sensors, in particular by means of a camera of the token and/or the craftsman device and/or by means of communication with a communication means or a token of the work protection means;

wherein operation of the craftsman device without coupling with the token is prevented.

14. A method for user-based control of a craftsman device by means of a token of a system comprising:

a token for user-related control of a craftsman device, the token comprising: a processor which is configured for control-related interaction with the craftsman device;

an identification means configured to identify a user of the token;

a first memory means with stored information indicative of or allowing access to a personalized authorization profile of the user with respect to the craftsman device; and an energy supply device;

wherein the processor is configured to allow, set and/or prevent use of the craftsman device by the user based on the personalized authorization profile when the token is coupled to the craftsman device;

the craftsman device which is configured for coupling with the token in such a way that use of the craftsman device coupled with the token by a user is allowed, set and/or prevented based on the personalized authorization profile;

wherein the craftsman device comprises a second memory means for storing the authorization profile, wherein the second memory means can be coupled to the token in a communicable manner in order to store the authorization profile in the second memory means by means of the token and/or to download it from the second memory means by means of the token; and a token holder for holding and carrying the token, the token holder being configured to hold the token in a form-fit and/or force-fit manner and to trigger a recharging of the energy supply device of the token by attaching the token with the completely or partially discharged energy supply device to the token holder;

wherein the method further comprises:

identifying a user of the token;

finding a personalized authorization profile of the user of the token; and upon coupling the token with the craftsman device, allowing, setting and/or prohibiting use of the craftsman device by the user based on the personalized authorization profile.

* * * * *